UNITED STATES PATENT OFFICE.

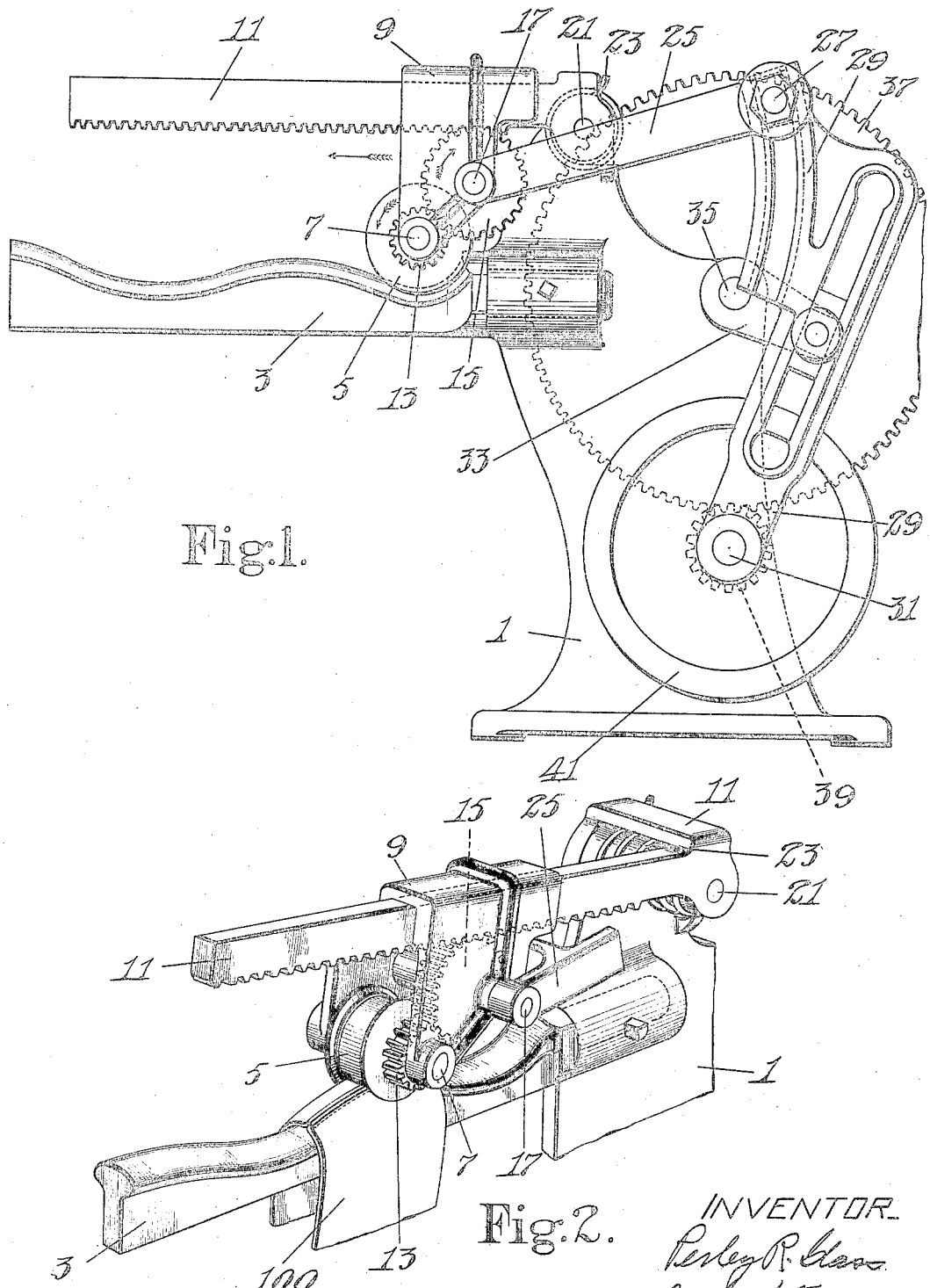

PERLEY R. GLASS, OF BROOKLINE, MASSACHUSETTS, ASSIGNOR, BY MESNE ASSIGN-
MENTS, TO UNITED SHOE MACHINERY CORPORATION, OF PATERSON, NEW JER-
SEY, A CORPORATION OF NEW JERSEY.

SEAM-RUBBING MACHINE.

1,346,194.      Specification of Letters Patent.      Patented July 13, 1920.

Application filed April 13, 1916. Serial No. 90,871.

*To all whom it may concern:*

Be it known that I, PERLEY R. GLASS, a citizen of the United States, residing at Brookline, in the county of Norfolk and State of Massachusetts, have invented certain Improvements in Seam-Rubbing Machines, of which the following description, in connection with the accompanying drawings, is a specification, like reference characters on the drawings indicating like parts in the several figures.

This invention relates to machines for use in the manufacture of boots and shoes and is herein illustrated in connection with a machine for pressing or rubbing seams formed in the uppers of boots and shoes.

Certain parts of uppers of boots and shoes are commonly united at their rear portions by a seam, and the rear portion or back of the upper is reversely curved to conform to the foot of the wearer. The parts of the upper are sewed together wrong side out, and then the edges which project beyond the line of stitches are spread apart and pressed or rubbed.

According to one feature of the invention the horn or other work support is traversed by a roller mounted in a reciprocating carriage which is guided in its movement by a rack, gearing being interposed between the rack and the roller to cause rotation of the latter first in one direction and then in the other. There is thus obtained a combined pressing and rubbing action upon the work.

These and other features of the invention, including certain details of construction and combinations of parts will be described in connection with an illustrative machine and pointed out in the appended claims.

Referring now to the accompanying drawings,—

Figure 1 is a side elevation of a machine in which the present invention is embodied, and Fig. 2 is a perspective of a part of the machine.

Extending horizontally from the frame 1 of the machine is a support or horn 3, T-shaped in cross-section, the operative or supporting face of which has a reversely curved outline whereby a back seam may be pressed without destroying or materially changing the curve of the back of the upper. A roller 5 having flanges which project so as to embrace the sides of the horn is fast to a short shaft 7 which is rotatable in bearings in a carriage 9. This carriage is slidable upon a rack 11, and the rack is operatively connected with the roller 5 by gearing comprising a gear 13 fast to the short shaft 7 and a gear 15 which meshes both with the rack 11 and with the gear 13, said gear 15 being fast to a second rotatable short shaft 17 mounted in bearings in the carriage 9. The rack 11 is pivoted at 21 to the frame of the machine and is continually urged to move in a counter-clockwise direction by a coiled spring 23 as shown. The roller 5 is thus held at all times against the horn or against a piece of work such as that indicated at 100 if such work is placed on the horn. It will be noted that reciprocation of the carriage 9 along the rack 11 will cause rotation of the roller 5 first in one direction and then in the other and that, owing to the dimensions of the gears 13 and 15, the peripheral velocity of the roller will exceed the velocity of its bodily movement.

In order to effect reciprocation of the carriage 9 a link 25 is pivoted at one end to the short shaft 17 and at the other to a headed bolt 27 which is adjustable along an undercut groove in a rocker arm 29, such adjustment serving to vary the location of the path of reciprocation of the roller 5. The rocker arm is pivoted about a shaft 31 and is oscillated by a crank 33 the outer end of which has a pin and slot connection with said rocker arm. The crank 33 is fast to a rotatable shaft 35 to which is also fast a large gear 37, said gear being driven by a small gear 39 fast to the shaft 31. A pulley 41 furnishes means for connecting the machine with a suitable source of power.

In the operation of the machine an upper is placed upon the horn in the manner illustrated in Fig. 2, and power is applied to the machine. The roll 5 is thereby reciprocated over the horn and rotated first in one direction and then in the other, the peripheral velocity of the roller being greater than that of its bodily movement, this pressing and rubbing operation being continued until the seam is properly flattened.

Although the invention has been set forth in connection with a particular machine, it should be understood that the invention is not limited in the scope of its application to the particular machine shown and described.

Having thus described my invention, I claim as new and desire to secure by Letters Patent of the United States:

1. A machine of the class described, having, in combination, a horn for supporting a piece of stock, a roller arranged to travel over said horn, yielding means for holding said roller against said horn, means for reciprocating said roller bodily over said horn, means for rotating said roller, said means being arranged to cause a reversal of the direction of rotation of said roller at each reversal of direction of bodily movement thereof, and means for varying the location of the path of reciprocation of said roller.

2. A machine of the class described, having, in combination, a horn for supporting a piece of stock, a roller arranged to travel over said horn, a carriage in which said roller is mounted, a rack pivoted to the frame of the machine and serving as a guide for said carriage, a spring tending to swing said rack downwardly toward said support, gearing between said rack and roller, and means for reciprocating said carriage.

3. A machine of the class described, having, in combination, a horn for supporting a piece of stock, a roller arranged to travel over said horn, a carriage in which said roller is mounted, a rack pivoted to the frame of the machine and serving as a guide for said carriage, a spring tending to swing said rack toward said support, gearing between said roller and rack, an oscillating arm, and a link connecting said arm with said carriage.

4. A machine of the class described, having, in combination, a horn for supporting a piece of stock, a roller arranged to travel over said horn, a carriage in which said roller is mounted, a rack pivoted to the frame of the machine and serving as a guide for said carriage, a spring tending to swing said rack toward said support, gearing between said roller and rack, an oscillating arm, a link connecting said arm with said carriage, and means whereby the location of the connection between said link and arm may be varied.

In testimony whereof I have signed my name to this specification.

PERLEY R. GLASS.